(12) United States Patent
Irving

(10) Patent No.: US 6,648,261 B2
(45) Date of Patent: Nov. 18, 2003

(54) EXTENDIBLE AND RETRACTABLE LEAD

(75) Inventor: Andy Irving, Liverpool (GB)

(73) Assignee: Harry Irving & Co. Limited (GB)

( * ) Notice: Subject to any disclaimer, the term of this patent is extended or adjusted under 35 U.S.C. 154(b) by 48 days.

(21) Appl. No.: 09/945,976

(22) Filed: Sep. 4, 2001

(65) Prior Publication Data

US 2003/0042350 A1 Mar. 6, 2003

(51) Int. Cl.$^7$ .................. B65H 75/30; B65H 75/48; A01K 27/00
(52) U.S. Cl. ................... 242/384.7; 119/796
(58) Field of Search .............. 242/384.7, 385.4, 242/396.1, 396.2, 396.3, 396.4, 381.6; 119/796; 33/767

(56) References Cited

U.S. PATENT DOCUMENTS

| | | | | |
|---|---|---|---|---|
| 2,314,504 A | * | 3/1943 | Lifchultz | 242/385.4 |
| 4,856,726 A | * | 8/1989 | Kang | 242/384.7 |
| 5,377,626 A | * | 1/1995 | Kilsby et al. | 242/384.7 |
| 5,400,521 A | * | 3/1995 | Waldherr | 242/385.4 |
| 5,483,926 A | * | 1/1996 | Bogdahn | 119/796 |
| 6,148,773 A | * | 11/2000 | Bogdahn | 119/796 |

FOREIGN PATENT DOCUMENTS

EP 0 464 725 A1 * 1/1992 ................ 119/796

* cited by examiner

Primary Examiner—John M. Jillions
(74) Attorney, Agent, or Firm—Reed Smith LLP

(57) ABSTRACT

An extendible and retractable lead that can be extended or retracted and locked in position in a single action. The lead comprises a casing (4) housing a reel (14), a lead windable about the reel, the casing having an outlet (8) for passage of the lead and further comprising a moveable member (12) for engagement and disengagement with the reel, a part (32) of the moveable member being engageable with a retainer (52) on movement of the member towards the reel to lock the member against the reel in a single action.

26 Claims, 2 Drawing Sheets

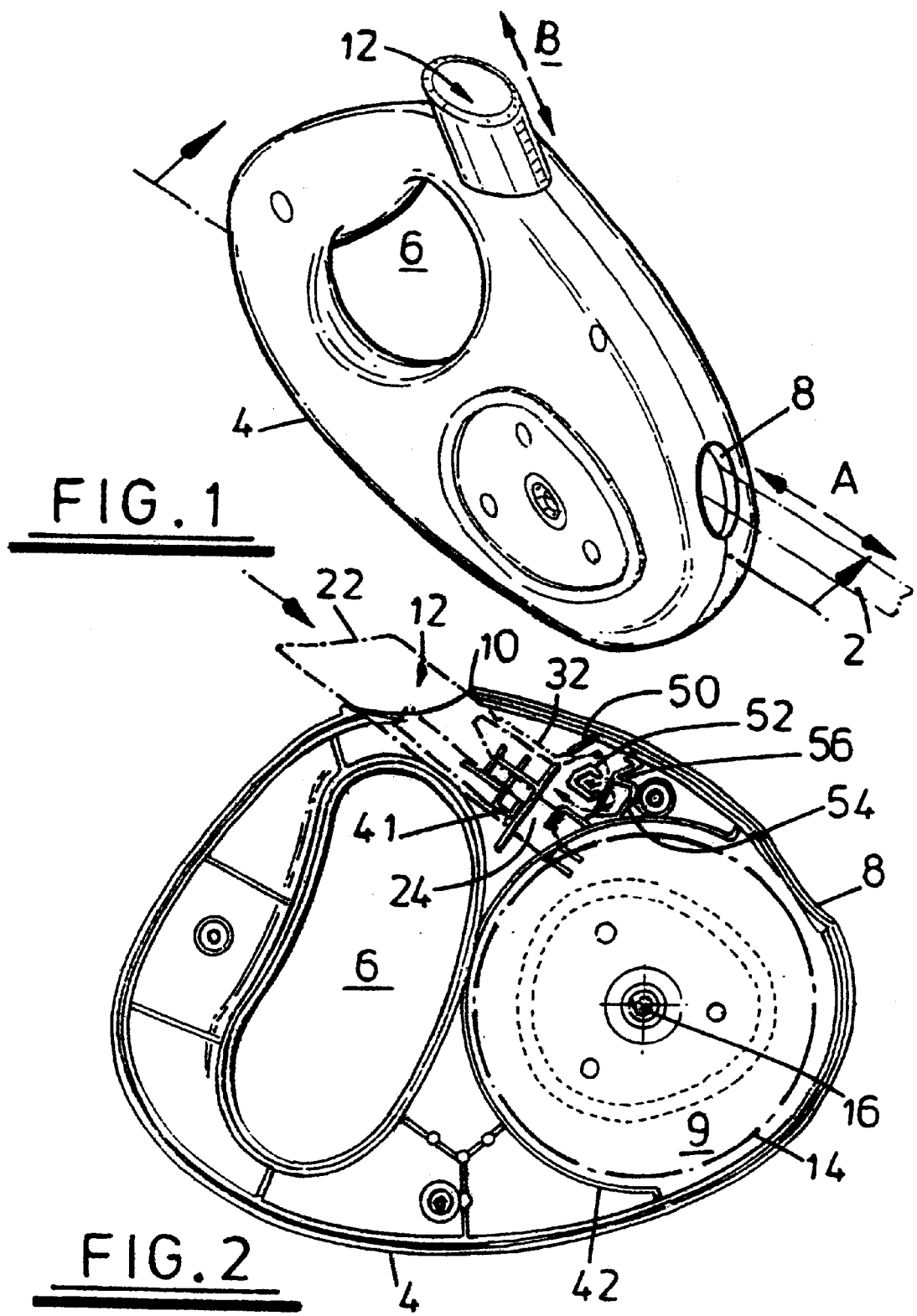

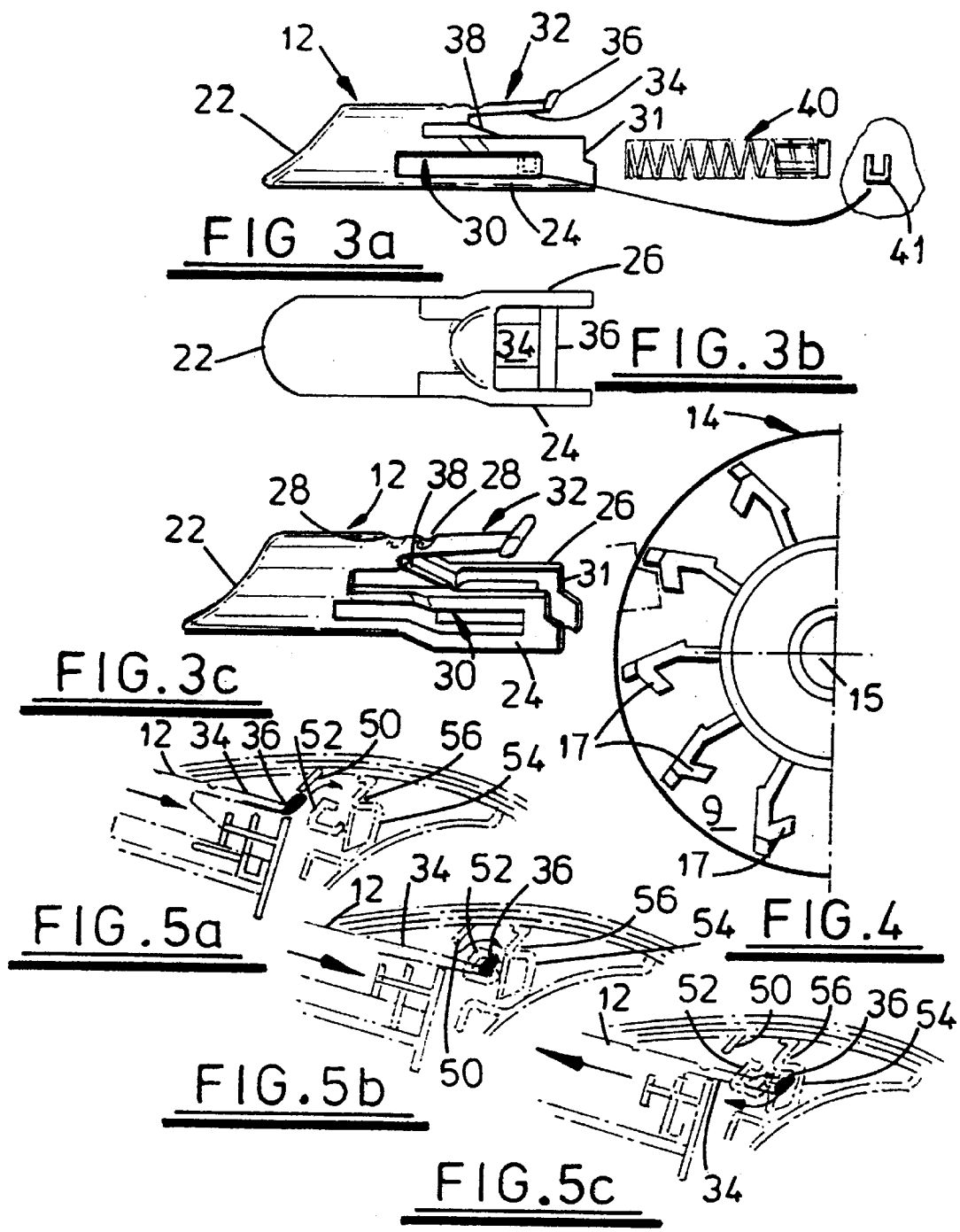

EXTENDIBLE AND RETRACTABLE LEAD

CROSS-REFERENCES TO RELATED APPLICATIONS

"Not applicable".

STATEMENT REGARDING FEDERALLY SPONSORED RESEARCH OR DEVELOPMENT

"Not applicable".

BACKGROUND OF THE INVENTION

1. Field of the Invention

The present invention relates to an improved extendible and retractable lead, particularly but not exclusively for use as an extending dog lead.

2. Description of the Related Art

Extending dog leads that enable the length of the lead to be altered have been widely available for a number of years. Generally, the leads are rotated around a reel within a handle part of the lead and a member can be pushed against the reel to prevent movement thereof. A separate locking mechanism then has to be operated to maintain the member in this position thereby preventing further movement of the reel and thus maintaining the lead at a given length. However, these types of leads can be difficult to operate because they involve two actions, pushing a trigger onto the reel and then moving a further member, for example in the form of a switch, to lock the trigger against the reel.

It is an object of the present invention to provide an extendible and retractable lead that can be operated in a single action.

BRIEF SUMMARY OF THE INVENTION

Accordingly, the present invention provides an extendible lead comprising a casing housing a reel, a lead windable about the reel and a retainer, the casing having an outlet for passage of the lead and further comprising a moveable member for engagement and disengagement with the reel, characterised in that a part of the moveable member is engageable with the retainer on movement of the member towards the reel, thereby locking the member against the reel in a single action.

The casing is preferably formed of two halves that may be secured together by suitable fixing means. The casing preferably includes an elongated oval passage therethrough for serving as a handle. The two halves of the casing are preferably injection moulded components, the inner profile of the casing being shaped appropriately to house and retain the positioning of the internal components contained therein. The casing is preferably made of a tough, rigid plastics material, such as polypropylene.

Any conventional reel may be employed in the device of the present invention for winding of the lead therearound. Preferably, each end of the reel is provided with parallel flanges extending perpendicularly around the periphery thereof for encasing the lead. The flanges may be provided with ribbing on the outer surface thereof.

The lead may made of any suitable material for forming an elongated strap, for example the lead may be formed of a length of cord attached to a further length of strapping or may be formed of strapping only, for example being made of nylon. The outlet provided in the casing for passage of the lead is preferably crescent-shaped to eliminate twisting of the lead. Suitable fastening means are attached to the end of lead to enable it to be fastened to, for example, a collar.

The moveable member preferably extends from the exterior of the casing into the interior thereof, the casing being provided with an appropriate aperture for passage of the member. The part of the moveable member that engages with a retainer is preferably in the form of a resiliently deformable latch extending from the member. Preferably, the latch is in the form of a living hinge. The moveable member preferably comprises a knob or button part located exteriorally to the casing for imparting movement to the member connected to two parallel side arms within the interior of the casing that, in the forward position, co-operate with the ribs on the reel to prevent rotation thereof. The latch part is preferably within the casing and extends from the knob or button part between the side arms. Preferably the latch extends approximately three quarters along the length of the side arms. The latch is preferably T-shaped, being comprised of a lever and cross bar. Preferably the cross bar is angled obliquely with respect to the lever. It is to be appreciated that the latch should be formed of a material having a degree of flexibility, such as an acetyl material.

The moveable member is preferably provided with biasing means. Preferably, a spring extends between the moveable member and abutment means. Contact with the abutment means biases the spring towards the end of the member. Preferably, the side arms are relieved of material along the length thereof to provide slots. The abutment means preferably extends through the slots.

The retainer is preferably provided within the casing. Preferably, the retainer is a C-shaped catch, the back part of the retainer being closest to the latch when the moveable member is disengaged from the reel. Pushing the knob of the member causes it to move towards the reel and, in doing so, the latch is forced over the back of the retainer and into the recess. This locks the member against the reel. Pushing of the knob a second time causes the latch to be forced out of the retainer thereby enabling the moveable member to move back from the reel.

Preferably, the device is also provided with guides for directing the latch of the member into and out of the retainer. Preferably, the guides are substantially parallel to the contours of the retainer. More preferably, two sets of guides are provided around opposing sides of the retainer, the guides meeting at an apex that points towards the centre of the recess of the retainer. Guides may also be provided to aid movement of the side members.

Preferably, the guides and retainer are formed integrally with the moulded casing. A lubricant may be provided to assist in the smooth operation of the working components.

In a preferred embodiment of the present invention there is provided an extendable and retractable lead comprising a casing housing a reel, a lead windable about the reel and a retainer, the casing having an outlet for passage of the lead and further comprising a moveable member for engagement and disengagement with the reel, the moveable member having side arms and a resiliently deformable latch, whereby movement of the member towards the reel causes the latch to engage with the retainer and thereby lock the side arms of the member against the reel.

BRIEF DESCRIPTION OF SEVERAL VIEWS OF THE DRAWINGS

For a better understanding of the present invention and to show more clearly how it may be carried into effect, reference will now be made by way of example only to the accompanying drawings in which:

FIG. 1 is a perspective view of a casing of an extendible and retractable lead according to one embodiment of the-present invention;

FIG. 2 is a cross-sectional view of one half of the casing shown in FIG. 1 illustrating the internal components thereof;

FIGS. 3a, 3b and 3c are respectively a side view, top plan view and perspective view of the trigger means contained in the casing shown in FIG. 1;

FIG. 4 illustrates engagement of the trigger means with the reel of the lead; and FIGS. 5a, 5b and 5c illustrate the movement of the trigger means between its locked and unlocked positions during operation of the lead shown in FIG. 1.

DETAILED DESCRIPTION OF THE INVENTION

Referring to the accompanying drawings, an extendible and retractable lead according to one embodiment of the present invention is illustrated. The lead comprises a length of cord 2 and a casing 4. The casing 4, serving as the handle for the lead, contains the mechanism for enabling extension and retraction of the lead 2. The cord may be attached by suitable means to a length of strapping or the entire length of the lead may comprise strapping (not shown). The casing is a plastics moulded component, for example being of polypropylene, and is comprised of two halves that may be secured together my suitable fixing means. A handle or hand grip 6 is provided within the casing by the provision of a large hole through the centre of the casing, an aperture 8 is provided at the front end thereof to enable unhindered movement of the cord or strapping between the interior and exterior of the casing (as illustrated by arrow A in FIG. 1) and a further aperture 10 is provided for passage of trigger means 12 that activates the mechanism for extension or retraction of the lead (see arrow B).

FIGS. 2 to 4 of the accompanying drawings illustrate the internal components of the casing that enable controlled extension and retraction of the lead. The components are housed within their own compartments formed by the internal profile of the moulded casing. A reel 14 having a central bore 15 is mounted on a pivot 16 that is formed integrally with one half of the casing 4 and a length of cord or strapping is wound around the reel, the free end of which extends through the aperture 8. The top and bottom of the reel are provided with parallel flanges 9 extending substantially perpendicularly from the reel around the periphery thereof which enclose the cord or strapping. The outwardly facing surfaces of the flanges are provided with spaced apart ribs 17 formed integrally therewith (see FIG. 4).

The casing also houses a proportion of the trigger means 12 that is in the form of a hollow moulded component (see, in particular, FIGS. 3a to 3c). One half of the trigger means is generally cylindrical and is provided with a concave outer end profile 22 for receiving the thumb of the operator of the lead. This part of the trigger means extends through the aperture 10 to the exterior of the casing. The trigger means is also provided with two parallel side members 24, 26 that are each relieved of material throughout the centre of the length thereof to provide parallel slots 30 and the free end of each member is biased shaped to provide an indentation 31. The shaping of the end of each member corresponds to the end profile of the ribs 16 (see FIG. 4). The roof between the side members 24, 26 is provided by a resiliently deformable latch in the form of a living hinge 32 that extends approximately three-quarters along the length of the side members. The hinged latch is generally T-shaped having a lever 34 extending from the centre of the trigger means with a cross member 36 extending perpendicularly across the end of the lever. The area of material that joins each side member to the latch is oblique to form shoulders 38 and the end of the lever where it joins the main body of the trigger means is thinned 28 to increase the flexibility of the latch. Additionally, a spring 40 is provided extending from the interior of the trigger means towards the free ends of the side members and is biased towards the interior of the trigger means by abutment means 41 formed as part of the moulded casing (see FIG. 3a).

The orientation and movement of the trigger means, reel and spring is controlled by the particular moulding of the interior surface of the casing. The part of the casing for housing the reel is provided with a circular compartment, the sides thereof formed by raised areas or ridges 42 in the moulding and by the side walls of the casing. One half of the casing is provided with a pivot female member 16 moulded integrally therewith onto which the reel is placed, and the corresponding location in the other half of the casing is provided with a short male member (not shown) that engages with the female member when the device is fully assembled. Additionally, breaks in the side walls of the compartments are provided to produce a gap for passage of the trigger means and to provide the aperture 8 for passage of the cord or strapping.

The particular configuration of the moulding provided in the region of the casing that houses the trigger means is important. The area through which the living hinge can move upon application of force to the trigger to overcome the biasing of the spring is provided with a series of guides 50, 54 separated by a retainer 52. The guides and retainer are again formed by the profile of the internal moulding of the casing. The retainer is substantially C-shaped having one set of guides 50 formed around one half thereof and a second set of guides formed around the opposing side thereof. The contours of the guides are substantially parallel to the contours of the retainer. However, the guides meet above the centre of the opening of the retainer to form an apex 56. The same configuration of guides and retainer are provided in corresponding positions in both halves of the casing. Additionally, the interior of the casing has further raised members for guiding the passage of the side members (not shown).

Operation of the trigger means to prevent movement of the reel can be accomplished in a single motion. FIG. 4 and FIGS. 5a to 5c demonstrate how this is achieved by means of the present invention. Pushing the trigger means inwardly forces the cross member 36 of the latch onto the outer side of the retainer 52 and through the first set of guides 50 (see FIG. 5a). Continued movement of the trigger in that direction causes the cross member to turn around the top of the retainer and become lodged within the recess of the retainer (see FIG. 5b). Retention of the cross member in the retainer automatically locks the trigger means in a forward position which causes the free end of the side members 24 26 to be locked in position against the ribs 16 of the reel (see FIG. 4) thereby preventing rotation of the reel. Pushing the trigger means a second time in exactly the same manner causes the cross member 36 to be forced out of the retainer but, due to the angle of the cross member and the retainer, is directed through the second set of guides to release the latch thereby completing a substantially circular motion (see FIG. 5c). This enables the trigger means to move backwards thereby freeing the side members from the reel to allow rotation thereof. The spring acting on the trigger means assists in this movement.

Thus, the device of the present invention is operated by means of a single movement which pushes the trigger means against the reel to prevent movement thereof and simultaneously locks the trigger means in position. Further activation of the trigger in a similar forward motion releases the locking mechanism and frees the trigger from the reel. This is a far simpler mechanism than those previously available for operation of a retractable lead.

It is to be appreciated that the features provided by the moulding of the casing could be provided as separate components that are secured in the appropriate positions in the casing.

The cross member of the hinged latch is preferably angled obliquely with respect to the lever such that it lies substantially parallel with the entry to the guides. This assists in obtaining unhindered movement of the latch through the guide and the retainer. The retainer is substantially C-shaped such that the cross member is forced against a first region and then is forced around the roof of the retainer and back into the recess of the retainer where it sits until further force is applied to the trigger means. The feature of the apex between the guides assists in ensuring that the cross member moves from the retainer to the second set of guides rather than moving back into the first set of guides thereby providing smooth operation of the device.

It is clear that the latch has to be made of a resiliently deformable material that enables it to flex slightly to bend around the guides. For example an acetyl material may be used. In contrast the other parts of the lead may be formed of a more rigid material.

What is claimed is:

1. An extendible and retractable lead comprising a casing housing a reel, a lead windable about the reel and a retainer, the casing having an outlet for passage of the lead and further comprising a moveable member for engagement and disengagement with the reel, said moveable member having a hinged latch engageable with the retainer, said hinged latch alternately engaging with or disengaging from said retainer on movement of the member towards the reel, thereby alternately locking and unlocking the member against the reel in a single action.

2. An extendible and retractable lead as claimed in claim 1, wherein the casing is formed of two halves that are secured together by suitable fixing means.

3. An extendible and retractable lead as claimed in claim 1 wherein the casing includes an elongated oval passage therethrough for serving as a handle.

4. An extendible and retractable lead as claimed in claim 1 wherein the casing is injection moulded, the inner profile of the casing being shaped appropriately to house and retain the positioning of the internal components contained therein.

5. An extendible and retractable lead as claimed in claim 1, wherein each end of the reel is provided with parallel flanges extending perpendicularly around the periphery thereof for encasing the lead, the flanges having a plurality of ribs on the outer surface thereof.

6. An extendible and retractable lead as claimed in claim 1 wherein the moveable member extends from the exterior of the casing into the interior thereof, the casing being provided with an appropriate aperture for passage of the member.

7. An extendible and retractable lead as claimed in claim 5 wherein said hinged latch comprises a resiliently deformable latch extending from the moveable member.

8. An extendible and retractable lead as claimed in claim 7 wherein the moveable member comprises a knob or button part located exteriorally to the casing for imparting movement to the moveable member and a pair of parallel side arms within the interior of the casing that in a forward position, co-operate with the ribs on the reel to prevent rotation thereof, the latch being within the casing and extending between said side arms.

9. An extendible and retractable lead as claimed in claim 7 wherein the latch is T-shaped, being comprised of a lever and cross bar.

10. An extendible and retractable lead as claimed in claim 1 wherein the moveable member is provided with biasing means.

11. An extendible and retractable lead as claimed in claim 10, wherein said biasing means comprises a spring, said spring extending between the moveable member and an abutment means.

12. An extendible and retractable lead as claimed in claim 5 wherein the moveable member comprises a knob or button part located exteriorally to the casing for imparting movement to the moveable member and a pair of parallel side arms within the interior of the casing that in a forward position, co-operate with the ribs on the reel to prevent rotation thereof, the side arms being relieved of material along the length thereof to provide slots, the lead further comprising a spring and abutment means, the abutment means extending through the slots and the spring extending between the member and the abutment means.

13. An extendable and retractable lead as claimed in claim 1 wherein the retainer is formed integrally with the casing.

14. An extendable and retractable lead as claimed in claim 1 wherein the retainer is a C-shaped catch provided within the casing, the back part of the retainer being closest to the part of the moveable member that engages therewith when the moveable member is disengaged from the reel.

15. An extendable and retractable lead as claimed in claim 14 wherein guides are provided for directing the part of the moveable member into and out of the retainer.

16. An extendible and retractable lead as claimed in claim 14, wherein said retainer has contours defining the shape of the retainer, and wherein guides are provided for directing the part of the moveable member into and out of the retainer, the guides being substantially parallel to the contours of the retainer.

17. An extendible and retractable lead as claimed in claim 14 wherein two sets of guides are provided around opposing sides of the retainer, the guides meeting at an apex that points towards the centre of a recess of the retainer.

18. An extendible and retractable lead as claimed in claim 14 wherein two sets of guides are provided for directing the part of the moveable member into and out of the retainer, and wherein the guides are formed integrally with the casing.

19. An extendible and retractable lead as claimed in claim 1, wherein guides are provided to aid movement of the moveable member toward the reel.

20. An extendible and retractable lead as claimed in claim 19 wherein the guides are formed integrally with the casing.

21. An extendible and retractable lead comprising a casing housing a reel, a lead windable about the reel and a retainer, the casing having an outlet for passage of the lead and further comprising a moveable member for engagement and dis-engagement with the reel, the moveable member having side arms and a resiliently deformable latch, whereby movement of the member towards the reel causes the latch to engage with the retainer and thereby lock the side arms of the member against the reel.

22. An extendible and retractable lead comprising a casing housing a reel, a lead windable about the reel and a retainer, the casing having an outlet for passage of the lead and further comprising a moveable member for engagement and disengagement with the reel, said moveable member having a hinged latch engageable with the retainer on movement of the member towards the reel, thereby locking the member against the reel in a single action, further wherein the retainer is a C-shaped catch provided within the casing, the back part of the retainer being closest to the part of the moveable member that engages therewith when the moveable member is disengaged from the reel.

23. An extendible and retractable lead as claimed in claim 22 wherein guides are provided for directing the part of the moveable member into and out of the retainer.

24. An extendible and retractable lead as claimed in claim 22 wherein said retainer has contours defining the shape of the retainer, and guides are provided for directing the part of the moveable member into and out of the retainer, the guides being substantially parallel to a portion of the contours of the retainer.

25. An extendible and retractable lead as claimed in claim 22 wherein two sets of guides are provided around opposing sides of the retainer, the guides meeting at an apex that points towards the centre of the recess of the retainer.

26. An extendible and retractable lead as claimed in claim 22 wherein the guides are formed integrally with the casing.

* * * * *

UNITED STATES PATENT AND TRADEMARK OFFICE
CERTIFICATE OF CORRECTION

PATENT NO.    : 6,648,261 B2
DATED         : November 18, 2003
INVENTOR(S)   : Andy Irving It is certified that error appears in the above-identified patent and that said Letters Patent is hereby corrected as shown below:

Column 3,
Line 61, "each member is biased shaped to…" should read as -- each member is shaped to… --

Column 6,
Line 20, "…of the casing that in a forward" should read as -- …of the casing that, in a forward --

Signed and Sealed this

Thirtieth Day of December, 2003

JAMES E. ROGAN
*Director of the United States Patent and Trademark Office*